(12) United States Patent
Chen et al.

(10) Patent No.: US 6,356,681 B1
(45) Date of Patent: Mar. 12, 2002

(54) METHOD AND APPARATUS FOR TRIMMING THE OPTICAL PATH LENGTH OF OPTICAL FIBER COMPONENTS

(75) Inventors: Gang Chen, Horseheads; Qi Wu, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/350,750

(22) Filed: Jul. 9, 1999

(51) Int. Cl.[7] .................................................. G02B 6/34
(52) U.S. Cl. .............................. 385/37; 385/10; 385/24; 385/123; 385/140; 372/102; 359/130
(58) Field of Search ........................... 385/24, 10, 37, 385/123, 124, 140; 359/124, 127, 128, 130; 372/6, 20, 102

(56) References Cited

U.S. PATENT DOCUMENTS

| | | | |
|---|---|---|---|
| 5,309,260 A | | 5/1994 | Mizrahi et al. ............... 385/37 |
| 5,506,925 A | * | 4/1996 | Greene et al. .............. 385/129 |
| 5,625,723 A | * | 4/1997 | Dragone et al. .............. 385/37 |
| 5,652,819 A | | 7/1997 | Orazi ........................... 385/37 |
| 5,694,512 A | * | 12/1997 | Gonthier et al. ............ 385/140 |
| 5,768,452 A | * | 6/1998 | Atkins et al. ................. 385/27 |
| 5,830,622 A | | 11/1998 | Canning et al. .............. 385/37 |
| 6,125,225 A | * | 9/2000 | Dianov et al. .............. 385/124 |

OTHER PUBLICATIONS

Kashyap et al, "Laser–Trimmed Four–Port Bandpass Filter", IEEE Photonis Technology Letters, vol. 5, No. 2, pp. 191–194, Feb. 1993.*

* cited by examiner

*Primary Examiner*—Hemang Sanghavi
(74) *Attorney, Agent, or Firm*—Svetlana Short; Price, Heneveld, Cooper, DeWitt & Litton

(57) ABSTRACT

The method and apparatus of the present invention achieves the trimming and, therefore, tuning of fiber optic devices by, in on embodiment, precisely heating a small area of a fiber to allow its elongation when mounted under tension in its package. By pulsing a source of heat in precise amounts, the elongation can be precisely controlled within 1 picometer precision over a tuning range of about 200 picometers. In another embodiment with fibers having core dopants which can be diffused, the optical length of an optical fiber can be trimmed with nanometer precision. By employing a controlled source of localized energy applied to the optical fiber, real time trimming can be achieved in both systems by injecting a broad band source of energy at the input of the device and coupling a spectral analyzer at its output to monitor the frequency characteristic of the optical device during trimming. In a preferred embodiment, the energy source comprised a $CO_2$ laser having a relatively narrow beam corresponding to the diameter of the optical fiber. Energy from the laser is directed to a small area of the optical fiber in pulses which provide precise control of the trimming process.

19 Claims, 2 Drawing Sheets

WAVELENGTH SHIFTS OF A FBG AFTER FIVE CONSECUTIVE EXPOSERS OF 2.5 SEC.

METHOD AND APPARATUS FOR TRIMMING THE OPTICAL PATH LENGTH OF OPTICAL FIBER COMPONENTS

BACKGROUND OF INVENTION

1. Field of the Invention

The present invention relates generally to the trimming of optical fiber components and particularly to a method and apparatus for achieving the trimming of the optical path length of an optical fiber component.

2. Technical Background

Optical fiber based devices are widely utilized as components for optical communications due to their relatively low insertion loss and low cost. Foremost of optical fiber components are fiber Bragg gratings (FBG) which are typically made by ultraviolet (UV) wavelength energy exposure. Once an FBG is mounted to a substrate and annealed, it is no longer photosensitive and cannot be further tuned. Thus, it is necessary to empirically predict the final frequency of such a grating which can lead to a significant error and gratings which are not within specifications. Due to the uncertainty of the wavelength shift resulting from the attachment process and annealing, the center wavelength of a package fiber Bragg grating typically has an error of +/−20 picometers from the desired center wavelength. Such a wavelength error combined with a wavelength drift of, for example, distributed feedback lasers, which may be from +/−50 picometers, and the residual temperature dependence of +/−20 picometers imposes a highly stringent requirement on the design of, for example, 50 GHz fiber Bragg gratings.

Infused fiber Mach-Zehnder interferometers are also wavelength selective and are used in a variety of communication devices, such as optical switches, filters, wave division multiplexers, demultiplexers, and add/drop filters as examples. In Mach-Zehnder based devices, the optical performance critically depends on the phase difference and/or optical path length difference between two interfering arms. Phase trimming has been attempted utilizing UV exposure to the fibers, however, such fibers must be photosensitive and, once annealed after such UV exposure, the trimming processes cannot be further controlled. Additionally, the maximum amount of trimming utilizing UV exposure is limited to a few wavelengths due to the relatively small refractive index change induced by UV radiation. In some applications, such a trimming process may not be sufficient to achieve the optical path length change necessary.

With optical path length sensitive fiber-based devices, therefore, not only is the tuning range a serious limitation by prior techniques, so is the tuning accuracy. There exists a need, therefore, for a system for the tuning of fiber optic devices over a relatively wide band of wavelengths, as well as to a precise wavelength.

SUMMARY OF THE INVENTION

The method and apparatus of the present invention achieves the tuning of fiber optic devices by, in one embodiment, precisely heating a small area of a fiber adjacent a grating mounted under tension to allow the grating length to change. By pulsing a source of heat in controlled amounts, the optical length of such a grating can be precisely controlled within 1 picometer precision over a tuning range of about 200 picometers.

In fibers having dopants which can be diffused, the length of an optical fiber can be trimmed with nanometer precision by thermal diffusion which directly affects the refractive index of the fiber, thereby effectively changing its optical path length.

In either embodiment, real time tuning is achieved by injecting a broad band source of energy at the input of the device and coupling a spectral analyzer at its output to monitor the center frequency of the optical device during trimming using a controlled source of localized energy applied to the optical fiber. In a preferred embodiment of the invention, the energy source comprised a laser and particularly a $CO_2$ laser having a relatively narrow beam corresponding to the diameter of the optical fiber employed in the device. Energy from the laser is directed to a small area of the optical device in pulses which provide precise control of the trimming process.

A method of trimming an optical fiber component by directing a source of radiation onto a section of the component for heating the section, coupling a broad band source of signals to an input of the component, coupling an optical analyzer to an output of the component, and monitoring the signal at the output of the component while selectively applying the radiation to the component from the source to achieve a predetermined trimming effect.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description are exemplary of the invention only and are intended to provide an overview for the understanding of the nature and character of the invention as it is defined by the claims. The accompanying drawings are included to provided a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
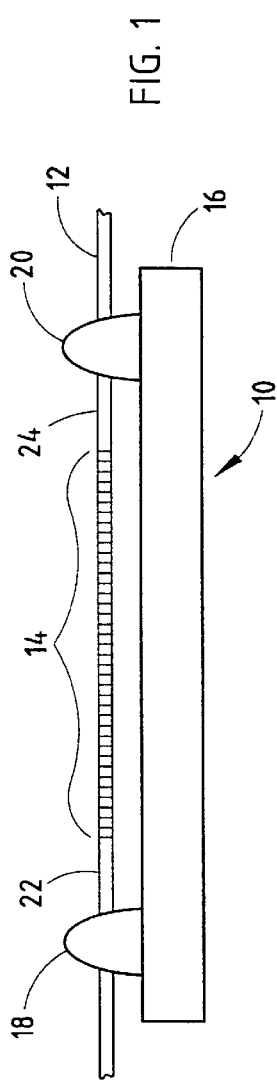
FIG. 1 is an enlarged schematic side elevational view of a fiber Bragg grating, shown partially packaged.

Referring initially to FIG. 1, there is shown a typical fiber Bragg grating assembly 10 which includes an optical fiber 12 on which there is imprinted in a central area 14 spanning a width of approximately 30 millimeters, a grating desired to be tuned to 1559.25 nanometers (nm). The optical fiber 12 is supported on a negative coefficient of expansion substrate 16, such as β-eucryptite, by a pair of spaced glass frits 18 and 20. Between the glass frits 18 and 20, there exists end zones 22 and 24 spanning the grating 14 and each having a length of approximately 10 millimeters such that the overall distance between frits 18 and 20 is approximately 50 millimeters.

Fiber 12 is mounted to the substrate 16 under a tension of approximately 10 kpsi, with grating 14 being conventionally formed utilizing an ultraviolet light to change the index of refraction of the core of the fiber 12 in a pattern selected for a wavelength of approximately 1559.2 nanometers as an example. Naturally, other frequency fiber Bragg gratings can be trimmed with the trimming method of the present invention. The grating assembly 10 is then annealed, which eliminates the photosensitivity of the fiber 12, preventing any further tuning. As a result, the exact frequency of the grating mounted to the substrate 16 can vary significantly. Before the final packaging of the grating shown in FIG. 1, it can be precisely trimmed, resulting in its tuning to an exact frequency utilizing the method and apparatus shown in FIG. 2 and now described.

Figure 2:
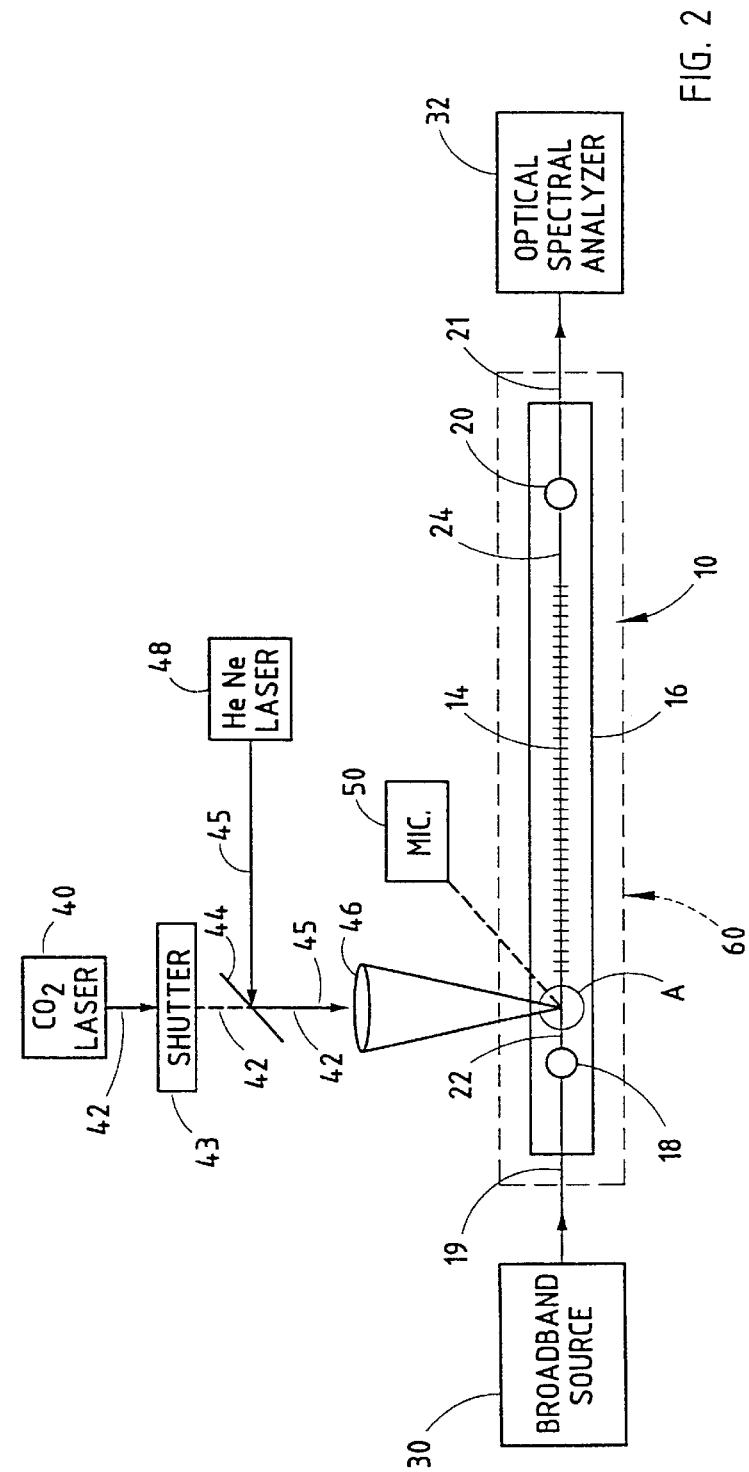
FIG. 2 is a top plan view of the fiber Bragg grating shown in FIG. 1 and the structure employed in practicing the method of the present invention and their relationship to the grating.

In FIG. 2, a top plan schematic view of the grating assembly 10 is shown. The grating is trimmed for the desired optical path length of the grating area 14 itself by heating an isolated area encircled as area A in FIG. 2 in end section 22 of the grating, although the trimming can take place at either of ends 22 or 24 or both, if desired. It was discovered that the area of fiber 12 adjacent grating 14 can be heated to change it viscosity, which is a function of the width "w" of an impinging laser beam and indirectly proportional to three times the elongation speed of section 22 upon heating according to the following formula:

$$\eta(T, z) = \frac{\sigma w}{3v}$$

after heating, where "T" is the heated temperature and "z" is the position of the laser beam.

After heating for a time "t", the localized fiber elongation Δ (causing the grating spacing to shorten) is:

$$\Delta = \frac{\sigma w}{3} \frac{t}{\eta(T, z)}. \quad \text{(equation 1)}$$

Thus, it was discovered that by controlling the local viscosity utilizing an appropriate heat source and exposure time, a small amount of elongation in the order of nanometers can be achieved. Before describing a specific example of the results obtained, a brief description of the equipment and method of FIG. 2 follows.

In FIG. 2, real time trimming of the grating 14 can be achieved by providing a broad band source 30 of optical energy to an input 19 of grating assembly 10, while an optical spectral analyzer 32 is coupled to an output 21 of the grating assembly 10. Thus, before trimming, the wavelength of the grating can be determined by viewing the display output from the analyzer 32. Assuming it is desired to trim the grating assembly 14, tuning it to a desired frequency, the localized heat source is applied to the center of the 10 mm section 22, that is 5 mm in from frit 18 in the preferred embodiment in the location identified by encircled area A. The energy employed is provided by a $CO_2$ laser 40 which has a frequency which provides heating of the area A. A conventional $CO_2$ laser, such as an SYNRAD 48-2W having a power stability within +/−1-percent per hour was employed in the preferred embodiment of the invention. The light beam 42 from $CO_2$ laser 40 is passed through a control shutter 43, through a beam splitter 44 onto a focusing lens 46 made of ZnSe having a 1.5 inch focal length, thus positioned approximately 1.5 inches from position A on the fiber Bragg grating. The laser beam 42 passes through the beam splitter 44, which is employed to coaxially align a visible light beam 45 from a helium neon laser 48 positioned to provide a combined beam 42 and 45 which is visible such that a microscope 50 can be positioned in the area adjacent position A for visibly inspecting the area to which the laser beam 42 is to be directed, assuring its freedom from dust particles or other contaminants and precisely aligning the $CO_2$ laser onto area A of the optical fiber. The microscope has a magnification of approximately 100× to monitor the heated region A.

The focused laser beam has a diameter substantially equivalent to the diameter of the optical fiber and, in the preferred embodiment, 125 μm. By providing the impinging heating light beam 42 from laser 40 laterally, as illustrated in FIG. 2, the substrate 16 is not heated, thereby not interfering with the trimming of the fiber Bragg grating 14. An example of the trimming of a fiber Bragg grating 10 having a length of 50 mm between the frits and a tension σ equal to 10 kpsi, a laser width "w" of 0.2 mm, trimming of 1.5 picometers in one second requires a viscosity of 13.0 dPa.s. This results in a temperature of 1,200° C. for the viscosity of silica employed for the optical fiber.

To achieve a trimming speed of 1 picometer per second, the laser power and focusing condition is first calibrated utilizing a packaged grating with a similar tension and attachment length. The grating is mounted on an XYZ translation stage 60 (shown in phantom in FIG. 2) and positioned utilizing the helium neon laser beam 45 and microscope 50. Due to the relative shallow depth of the field of the microscope, it effectively registers both lateral and axial positions of the heated region. If necessary for more precise registration, a second microscope orthogonal to the direction of the first microscope and to the laser direction can be employed for precise alignment. Once the reference fiber Bragg grating is aligned, the stage 60 can receive other gratings moved into the same initial position. Final adjustments and inspection of each grating being trimmed is similarly achieved using visible laser beam 45, microscope 50, and stage 60.

Figure 3:
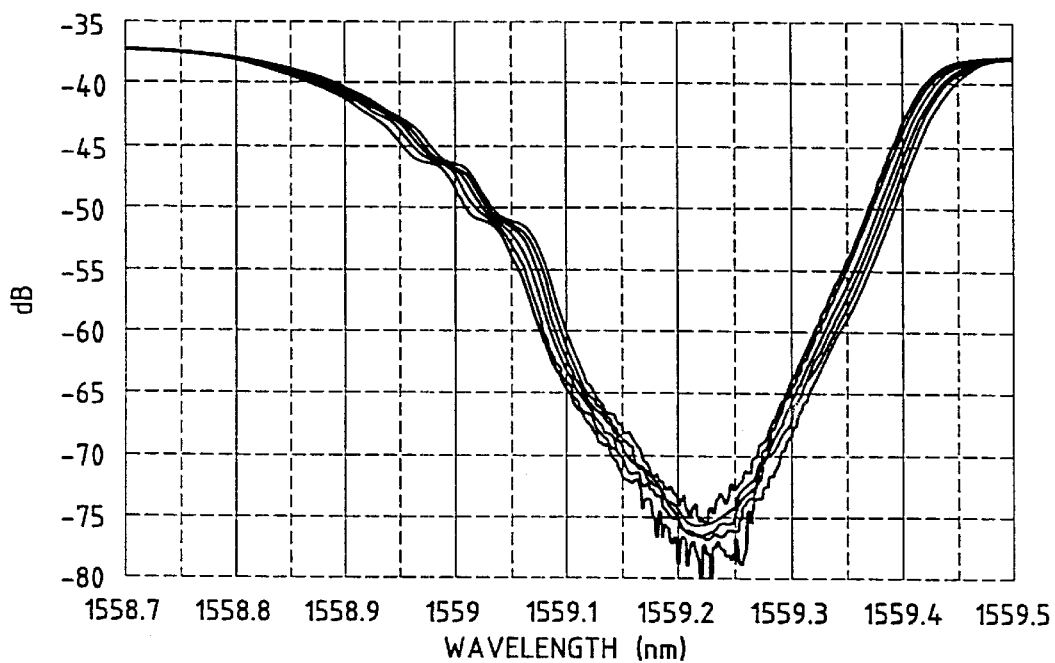
FIG. 3 is a waveform diagram illustrating the trimming of a fiber Bragg grating, employing the apparatus and method illustrated in FIG. 2.

The laser beam 42 is pulsed using the controlled electromechanical shutter 43 which provides pulses of selectable duration and frequency typically from 1 to 30 seconds in duration. The shutter 43 is a commercially available unit and allows laser 40 to remain continuously on for stability. The target tuned wavelength of the grating can be approached in small increments as illustrated by the waveform diagram of FIG. 3. Thus, for example, a trimming step of 4 picometers is obtained with the laser power adjusted to 0.660 watts and an exposure time of 2.5 seconds. FIG. 3 illustrates five consecutive exposures indicating a relatively linear shift in a gratings tuned wavelength. The wavelength shift is stabilized after about 10 seconds from the exposure to the laser beam 42. An exposure time of 0.5 seconds results in a wavelength shift of less than 1 pm, which is beyond the resolution of the optical spectral analyzer 32. The wavelength shift is shown by the following equation:

$$\frac{\Delta \lambda_{Bragg}}{\lambda_{Bragg}} = -\frac{\Delta}{l}$$

Where "l" is the fiber length between the two frits 18 and 20. The amount of trimming of the grating and tuning of the Bragg wavelength, therefore, is:

$$\Delta\lambda_{Bragg} = -\frac{\sigma w}{3l}\left(\frac{t}{\eta(T,z)}\right)\lambda_{Bragg}$$

where Δ is derived from equation 1 supra.

As can be seen from the above, a tuning step of 1.5 picometers corresponds to a fiber elongation of 50 nanometers, allowing grating 14 to contract and increase in frequency by as much as 200 picometers. This system, therefore, can be employed for providing precise trimming of, for example, Lucent 50 GHz gratings for center wavelength tuning.

The apparatus of FIG. 2 can also be employed for tuning of optical devices which are not mounted under tension and, therefore, the optical length changed not by allowing the relaxation of the optical fiber but instead by the diffusion of a dopant of an optical fiber. This changes the refractive index and, therefore, varies the optical length for precise tuning of, for example, a Mach-Zehnder interferometer as illustrated in FIG. 4.

Figure 4:
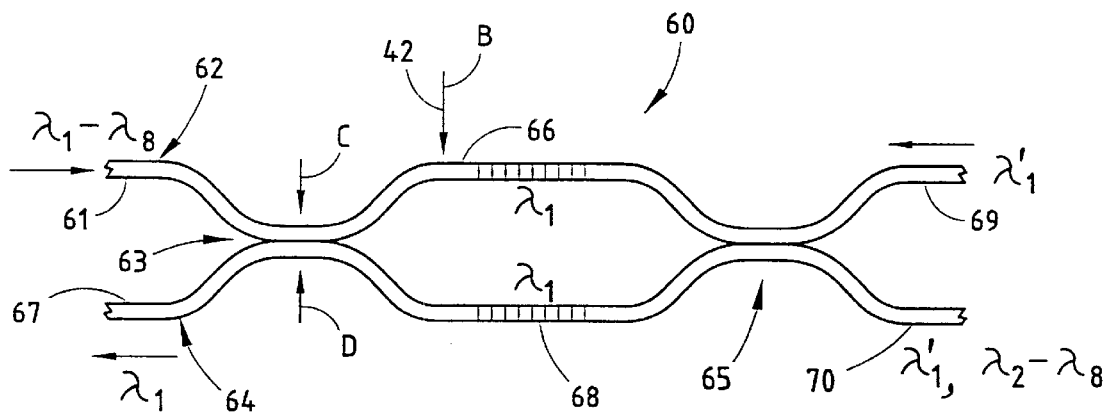
FIG. 4 is a schematic view of a Mach-Zehnder interferometer employed as an add drop filter, which can be trimmed according to an alternative embodiment of the present invention at locations indicated in FIG. 4.

Referring now to FIG. 4, there is shown a Mach-Zehnder optical device configured as a add-drop filter 60 which can be precisely tuned employing the method of the alternative embodiment of the present invention. The Mach-Zehnder add-drop filter 60 comprises first and second optical fibers 62 and 64, which are fused in a first coupler 63, and has branches with gratings 66 and 68, respectively, formed therein which can be tuned to matching wavelengths $\lambda_1$ as described in greater detail below. The fibers continue to a second fused coupler 65 and terminate in an input 69 for fiber 62 and an output 70 for fiber 64. Fiber 62 has an input 61 which receives, as an example, eight discrete wavelengths $\lambda_1-\lambda_8$ modulated with signal information. The add-drop filter 60 drops the $\lambda_1$ frequency at output terminal 67, allowing the addition of $\lambda_1'$ at input 69 to signals $\lambda_2-\lambda_8$ at output 70.

The Mach-Zehnder device 60 is conventionally fabricated and must be trimmed to tune gratings 66 and 68. Typically, Mach-Zehnder devices, such as device 60, have been trimmed utilizing ultraviolet radiation, however, as noted above, such radiation is ineffective once a device is annealed, and such annealing affects the optical path length thereby changing any trimming which may have taken place. Additionally, ultraviolet radiation is not as effective in changing the index of refraction and, therefore, the optical path length of the optical devices. As a result in the past, frequently an isolator was placed before the add port 69 to reduce multi-reflection interference. By using the trimming apparatus illustrated in FIG. 2 and applying heat at a precise location and in a controlled amount, the gratings 66 and 68 of the Mach-Zehnder device 60 can be precisely phase matched. The couplers 63 and 65 can also be trimmed to change their effective coupling length for providing a 50/50 coupler.

By applying precise amounts of energy through laser beam 42 in a manner similar to that described above with reference to FIG. 2 to the optical fiber area adjacent either of the interfering gratings 66 and 68 as shown by arrow B, for example, in FIG. 4, the core dopant diffuses toward the cladding, lowering the refractive index and shortening the optical path of one of the interfering arms 66, 68. The energy can be applied to either side of the center of gratings 66 or 68, depending on which of the legs needs to be optically shortened for phase matching of the two interfering gratings. Trimming can be done in real time by providing a broad band signal at input 61 and monitoring the output at port 70 to determine the absence of energy at the wavelength $\lambda_1$ for a filter dropping $\lambda_1$. The amount of energy is slightly greater than discussed with respect to the first embodiment with a $G_e$ doped fiber requiring somewhat larger pulses from laser 40 of about 10 to 30 seconds to raise the temperature of the optical fiber at target area B to about 1600° C. For fibers doped with Fl or Bo, a lower temperature of about 1400° C. results in the desired change in the refractive index n of the fiber to achieve trimming. Real time trimming is achieved by progressively applying pulses of the laser beam 42 while watching the output of analyzer 32 for the desired maximum rejection of the $\lambda_1$ frequency. Alternatively, output 67 can be monitored for the maximum level of $\lambda_1$ frequency reflected at the drop port 67.

In addition to phase matching the interfering gratings 66 and 68, the coupler 63 and decoupler 65 can be adjusted for providing equal splitting of energy by applying the laser energy to one or the other legs, as indicated by arrow C and D, respectively, again to cause the diffusion of the core's dopant material, lowering the index of refraction "n".

The same diffusion trimming technique can also be employed with unbalanced and lattice filters by phase trimming the amount of unbalance in the optical path length between the two arms of the Mach-Zehnder device, as well as the cross talk and optical switches may be optimized to better than 40 dB with such phase trimming and coupler trimming.

In the first embodiment of the invention, the grating spacing is shortened to increase the center frequency of the grating by lengthening the edge connection of the grating to the frit. In the second embodiment, the refractive index is lowered to decrease the optical length of a fiber optic component. With either embodiment, precise tuning of an optical fiber component can be achieved.

It will become apparent to those skilled in the art that various modifications to the preferred embodiment of the invention as described herein can be made without departing from the spirit or scope of the invention as defined by the appended claims.

The invention claimed is:

1. A method of trimming a fiber Bragg grating comprising the steps of:

positioning a fiber Bragg grating component with a section adjacent a grating thereof in fixed alignment with a source of radiation;

directing radiation onto the section of the component for heating the section to plastically deform the section to change the optical path of the fiber Bragg grating component for trimming the fiber Bragg grating component;

coupling a broad band source of signals to an input of the component;

coupling an optical analyzer to an output of the component; and monitoring the signal at the output of the component while selectively applying the radiation to the component from said source to achieve a predetermined trimming effect.

2. The method of claim 1 wherein the directing step includes providing a beam of radiation having a beam width substantially the size of an optical fiber of the component.

3. The method of claim 2 wherein the selective applying step includes interposing a shutter in the optical path of the beam and opening and closing the shutter to pulse the beam.

4. The method of claim 3 wherein the directing step includes employing a $CO_2$ laser to generate the beam of radiation.

5. A method of trimming an optical fiber component comprising the steps of:

directing a source of radiation onto a section of the component for heating the section, wherein said directing step includes employing a $CO_2$ laser as said source of radiation and further employing a visible spectrum laser with a beam coaxially aligned with the beam of said $CO_2$ laser onto said section of said component;

coupling a broad band source of signals to an input of the component;

coupling an optical analyzer to an output of the component; and monitoring the signal at the output of the component while selectively applying said radiation to the component from said source to achieve a predetermined trimming effect.

6. The method as defined in claim 5 wherein said directing step comprises positioning a fiber Bragg grating component with a section adjacent a grating thereof in alignment with said radiation and wherein said selective applying step plastically deforms said section to change the optical path of said fiber Bragg grating component for tuning said fiber Bragg grating component.

7. The method as defined in claim 5 wherein said directing step comprises positioning a section of a Mach-Zehnder component in alignment with said radiation and wherein said selective applying step diffuses dopant in the core of said section to change the refractive index and the optical path for tuning said Mach-Zehnder component.

8. An apparatus for trimming a Mach-Zehnder interferometer comprising:

a $CO_2$ laser for directing a beam therefrom onto a fixed section of at least one leg of a Mach-Zehnder interferometer;

a control coupled in the beam path of said laser to selectively pulse the beam for controlling the heating of the section of the fiber optic component;

a source of broad band signals coupled to an input of the fiber optic component; and a detector coupled to an output of the component for monitoring signals at the output while said beam is applied to the component wherein the beam from said $CO_2$ laser heats at least one section of one of the legs of the Mach-Zehnder interferometer such that a core dopant diffuses to change the index of refraction of the leg for trimming the Mach-Zehnder interferometer.

9. An apparatus for trimming a fiber optic component comprising:

a $CO_2$ laser for directing a beam therefrom onto a section of a fiber optic component;

a visible spectrum laser and an optical element for aligning the beam of said visible spectrum laser coaxially with the beam of said $CO_2$ laser for aligning the section of the fiber optic component with the $CO_2$ laser beam;

a control coupled in the beam path of said laser to selectively pulse said beam for controlling the heating of the section of the fiber optic component;

a source of broad band signals coupled to an input of the fiber optic component; and a detector coupled to an output of the component for monitoring signals at the output while said beam is applied to the component to trim the fiber optic component in a predetermined manner.

10. The apparatus of claim 9 and further including an XYZ stage receiving the fiber optic component for positioning the component in alignment with the beam.

11. The apparatus of claim 10 and further including an optical microscope positioned to view the visible spectrum laser beam for positioning the optical component with the beam impinging on the section of the fiber optic component.

12. The apparatus as defined in claim 9 wherein the fiber optic component is a fiber Bragg grating with an optical fiber mounted in tension to a substrate and wherein said beam from said $CO_2$ laser heats a section of said fiber Bragg grating adjacent a grating section to change the optical length of said grating section for trimming the fiber Bragg grating.

13. The apparatus as defined in claim 9 wherein the fiber optic component is a Mach-Zehnder interferometer and wherein said beam from said $CO_2$ laser heats at least one section of one of the legs of the Mach-Zehnder interferometer such that a core dopant diffuses to change the index of refraction of the leg for trimming the Mach-Zehnder interferometer.

14. A method of trimming an optical fiber component comprising the steps of:

providing a $CO_2$ laser source of radiation;

focusing the beam of the $CO_2$ laser to a beam width substantially the size of an optical fiber of the component;

aligning a fixed section of the component with the focused beam for heating the section;

coupling a broad band source of signals to an input of the component;

coupling an optical analyzer to an output of the component; and monitoring the signal at the output of the component while selectively applying said radiation to the component from said source to achieve a predetermined trimming effect.

15. A method of trimming an optical fiber component comprising the steps of:

providing a $CO_2$ laser source of radiation;

focusing the beam of said $CO_2$ laser to a beam width substantially the size of an optical fiber of the component;

aligning a section of the component with the focused beam by coaxially aligning the beam of a visible spectrum laser with the beam of said $CO_2$ laser for aligning the section of the fiber optic component with the $CO_2$ laser beam for heating the section;

coupling a broad band source of signals to an input of the component;

coupling an optical analyzer to an output of the component; and monitoring the signal at the output of the component while selectively applying said radiation to the component from said source to achieve a predetermined trimming effect.

16. The method of claim 15 and further including the step of positioning an optical microscope to view the visible spectrum laser beam impinging on the section of the fiber optic component for precisely positioning the optical component with the beam impinging on the section of the fiber optic component.

17. A method of trimming an optical fiber component comprising the steps of:

directing a $CO_2$ laser beam having a beam width substantially the size of an optical fiber of a component onto a section of a fiber optic component by employing a visible spectrum laser with a beam coaxially aligned with the beam of said $CO_2$ laser onto said section of said component for heating the section; and controlling the application of said beam on said section to achieve a predetermined trimming effect by interposing a shutter in the optical path of said beam and opening and closing said shutter to pulse said beam.

18. The method as defined in claim 17 wherein said directing step comprises positioning a fiber Bragg grating component with a section adjacent a grating thereof in alignment with said beam and wherein said controlling step plastically deforms said section to change the optical path of said fiber Bragg grating component for tuning said fiber Bragg grating component.

19. The method as defined in claim 17 wherein said directing step comprises positioning a section of a Mach-Zehnder component in alignment with said beam and wherein said controlling step diffuses dopant in the core of said section to change the refractive index and the optical path for tuning said Mach-Zehnder component.

* * * * *